(12) United States Patent
Lee

(10) Patent No.: US 6,193,306 B1
(45) Date of Patent: Feb. 27, 2001

(54) SUPPORT ASSEMBLY FOR A VEHICLE

(75) Inventor: Michael Lee, Macomb, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/470,358

(22) Filed: Dec. 22, 1999

(51) Int. Cl.[7] ................................................... B60J 7/00
(52) U.S. Cl. .................. 296/209; 296/186; 296/203.03; 296/205
(58) Field of Search ..................... 296/209, 186, 296/203.03, 205

(56) References Cited

U.S. PATENT DOCUMENTS

| | | | |
|---|---|---|---|
| 2,114,344 | * | 4/1938 | Haberstump ........................... 296/209 |
| 4,440,434 | * | 4/1984 | Celli ....................................... 296/205 |
| 4,471,992 | * | 9/1984 | Matsuura et al. ..................... 296/209 |
| 4,582,357 | * | 4/1986 | Nakamura et al. ................... 296/209 |
| 4,615,558 | * | 10/1986 | Nakamura et al. ................... 296/209 |
| 4,826,238 | * | 5/1989 | Misono et al. ........................ 296/209 |
| 4,944,553 | * | 7/1990 | Medley et al. ........................ 296/209 |
| 5,085,485 | * | 2/1992 | Wurl ...................................... 296/204 |
| 5,641,194 | * | 6/1997 | Honma et al. ........................ 296/209 |
| 5,782,525 | * | 7/1998 | Honma et al. ........................ 296/209 |
| 5,820,202 | * | 10/1998 | Ju .......................................... 296/205 |
| 6,042,176 | * | 3/2000 | Ikeda et al. ....................... 296/203.03 |

FOREIGN PATENT DOCUMENTS

| | | | | |
|---|---|---|---|---|
| 0198568 | * | 9/1987 | (JP) ..................................... 296/209 |
| 0018784 | * | 1/1989 | (JP) ..................................... 296/209 |
| 0124383 | * | 5/1990 | (JP) ..................................... 296/209 |
| 405286457 | * | 11/1993 | (JP) ..................................... 296/209 |
| 405294258 | * | 11/1993 | (JP) ..................................... 296/209 |
| 406166384 | * | 6/1994 | (JP) ..................................... 296/209 |
| 406171550 | * | 6/1994 | (JP) ..................................... 296/209 |

* cited by examiner

Primary Examiner—Joseph D. Pape
Assistant Examiner—Kiran Patel

(57) ABSTRACT

A support assembly 14 for a vehicle is disclosed. The assembly 14 offers added support to the body of the vehicle between the front and rear wheel wells of the vehicle. The support assembly 14 is particularly adaptable for use in convertible type vehicles.

20 Claims, 3 Drawing Sheets

SUPPORT ASSEMBLY FOR A VEHICLE

FIELD OF THE INVENTION

The present invention relates to a support assembly and more particularly, to a support assembly which is adapted for use in combination with a convertible type vehicle and which provides additional support to the vehicle.

BACKGROUND OF THE INVENTION

Vehicles are typically manufactured using a predetermined platform or underbody. Vehicle's having different designs or structures are often manufactured on the same platform or underbody. For example and without limitation, one vehicle design or version is commonly referred to as a sedan type vehicle, and is manufactured and/or formed with a solid and/or rigid roof that typically remains attached and/or connected to the body of the vehicle. A second platform design or version is commonly referred to as the convertible type vehicle, and is manufactured and/or formed with a relatively pliable and selectively removable roof.

The rigid roofs of sedan type vehicles tend to perform a "bridging" function which provides added support to the portion of the vehicle body which is disposed between the front and rear wheel wells (e.g., the "center portion" of the vehicle). Convertible type vehicles do not benefit from the aforementioned "bridging" function, as their selectively removable roofs are typically soft and/or flexible and do not provide the structural support afforded by the rigid roofs of sedan type vehicles. Without additional support, the bodies of convertible type vehicles are excessively compliant and tend to undesirably "twist" and/or bend when the vehicle is being driven, thereby adversely effecting the quality of the vehicle's "ride" which is experienced by the occupants of the vehicle.

Consequently, added support members and devices have been integrated into convertible type vehicles to increase the torsional stiffness and rigidity of convertible vehicles. The additional support members and/or devices are designed to absorb and/or divert torsional and/or bending forces and/or loads away from the center portion of the vehicle and to translate and/or transfer the forces and/or loads to other portions of the vehicle, such as portions which are in relative close proximity to the wheels of the vehicle. In this manner, these torsional and/or bending forces and/or loads are absorbed by portions of the vehicle frame that have a greater load bearing capacity (e.g., portions in close proximity to the vehicle's wheels).

These prior support members, systems, devices and methods used within convertible vehicles suffer from some drawbacks. For example and without limitation, when both a convertible type and a sedan type vehicle are to be manufactured on or from the same platform or underbody, these added support members or systems undesirably lengthen and complicate the manufacturing process. Particularly, the supports often cause the convertible assembly process to substantially differ from the sedan assembly process since these supports require substantial modifications to be made to the platform or underbody in order for the supports to be operatively used and/or deployed upon and/or within the convertible type vehicle, thereby complicating the overall vehicle assembly procedure and eliminating the benefits of using the same platform for a sedan and a convertible type vehicle. Moreover, the sedans and convertibles cannot be readily, practically, and interchangeably assembled, thereby further increasing the overall manufacturing cost and time.

Therefore, a need exists for a system and/or assembly which offers added support to convertible type vehicles and which does not require substantial modifications to be made to the platform and/or underbody of the vehicle.

SUMMARY OF THE INVENTION

It is a first object of the present invention to provide a vehicle support assembly which overcomes the various and previously delineated drawbacks of prior vehicle support assemblies and systems.

It is a second object of the present invention to provide a vehicle support assembly which allows a convertible type vehicle to be assembled in a relatively similar manner to a sedan type vehicle while providing the convertible type vehicle with additional support between the front and rear wheel wells.

It is a third object of the present invention to provide a vehicle support assembly which allows a convertible type vehicle to be assembled using the same platform or underbody as a sedan type vehicle without requiring substantial modification to the platform or underbody.

According to a first aspect of the present invention, a support assembly is for use within a vehicle is provided. The vehicle is of the type having an underbody, and a body assembly including a front wheel well and a rear wheel well. The support assembly includes a support member extending substantially between the rear wheel well and the front wheel well; an upper flange which projects orthogonally from the support member and which is fixedly connected to the support member, to the body assembly, and to the underbody; and a lower flange which projects orthogonally from the support member and which is fixedly connected to the support member, to the body assembly, and to the underbody, the lower flange cooperating with the upper flange to fixedly secure the support member to the body assembly and the underbody, thereby providing support to the vehicle between the front wheel well and the rear wheel well.

According to a second aspect of the present invention, a method for providing support to a vehicle body is provided. The vehicle body includes a floor side inner member and a floor side outer member. The method includes the steps of: providing a generally elongated support member; disposing the generally elongated support member between the floor side inner member and the floor side outer member; and fixedly coupling the generally elongated support member to the floor side inner member and the floor side outer member, thereby providing support to the vehicle body.

These and other objects, aspects, features, and advantages of the present invention will become apparent from a consideration of the following specification and the attached drawings.

DETAILED DESCRIPTION OF THE PREFERRED EMBODIMENT OF THE INVENTION

Referring now to FIGS. 1–7, there is shown a support apparatus or assembly 14 which is made in accordance with the teachings of the preferred embodiment of the invention. Assembly 14 is operatively disposed upon a vehicle 10 of the type including a conventional body or body assembly 11, and a conventional underbody platform or structure 12.

Figure 1:
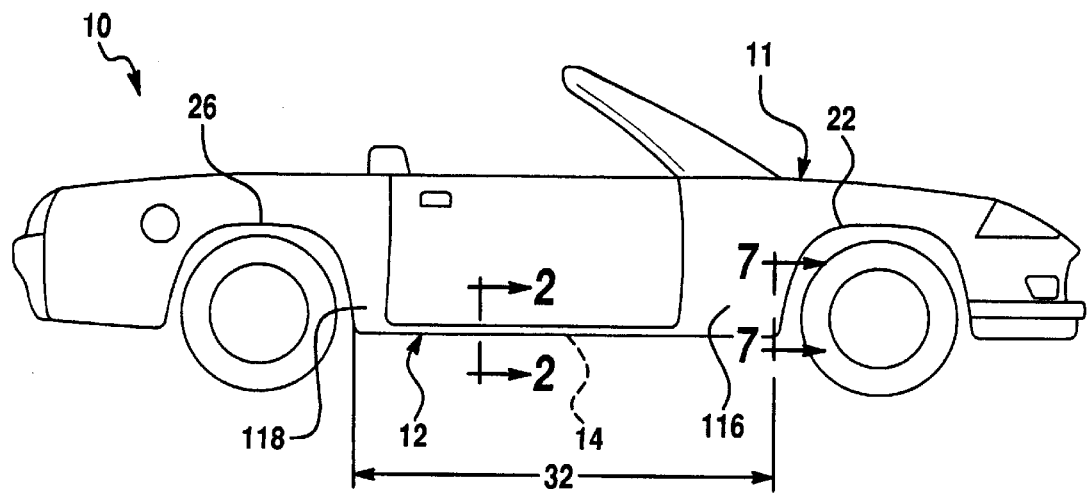
FIG. 1 illustrates a side view of a vehicle having a support assembly which is made in accordance with the teachings of the preferred embodiment of the present invention.
Figure 2:
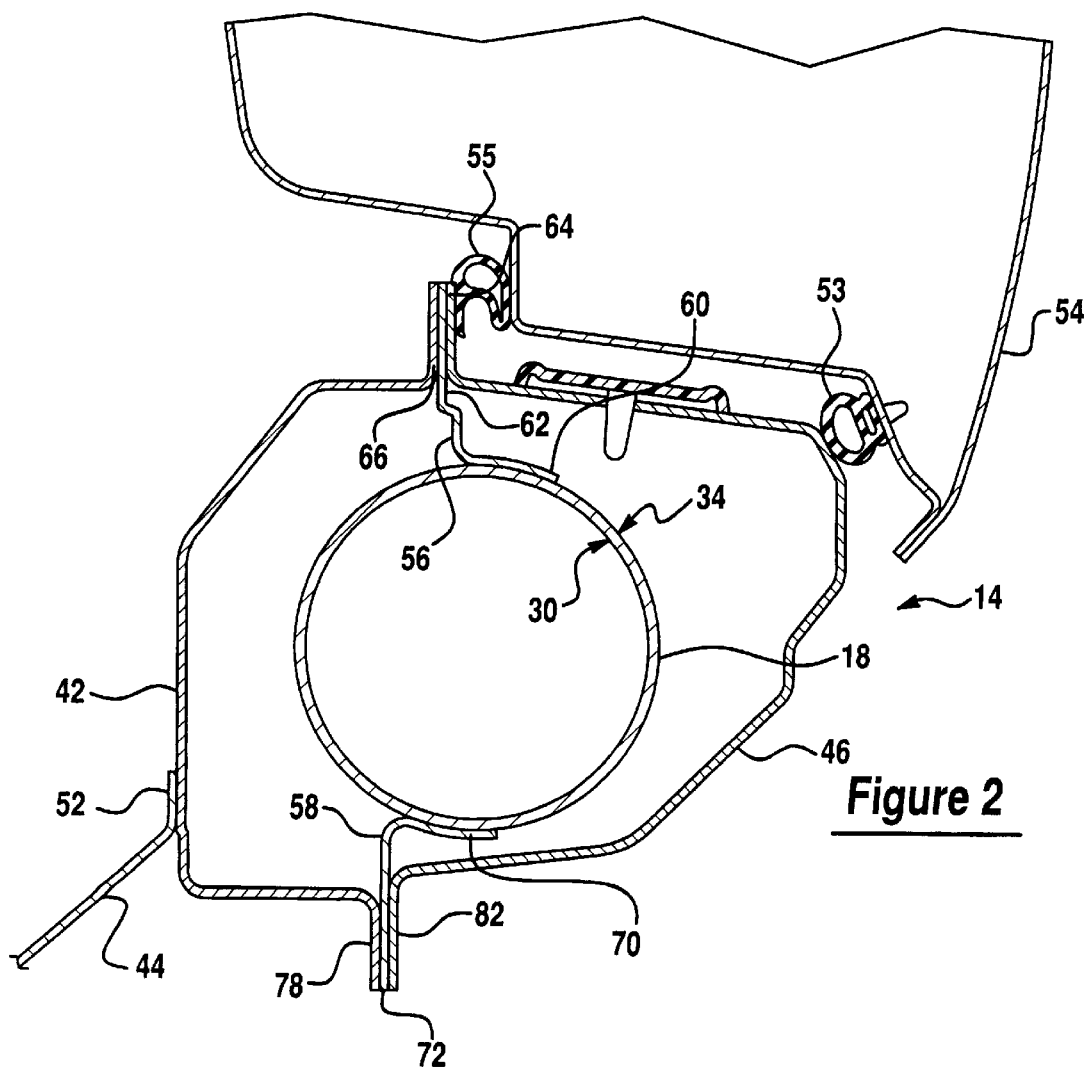
FIG. 2 illustrates a cross section of the support assembly which is made in accordance with the teachings of the preferred embodiment of the present invention and taken along view line 2—2 of FIG. 1.
Figure 3:
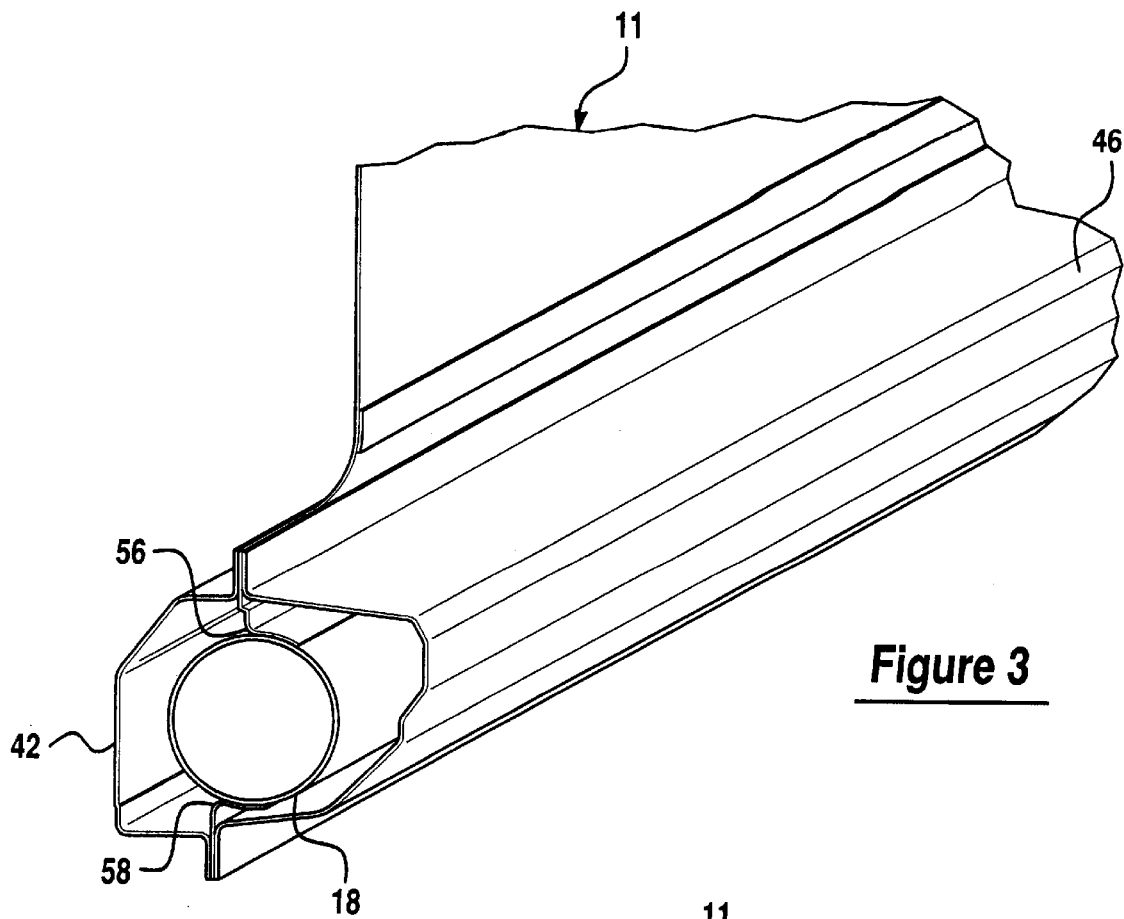
FIG. 3 is a partial perspective view of the support assembly shown in FIG. 2.

As best shown in FIG. 2, vehicle 10 and/or underbody 12 includes a "floor side inner" member or portion 42 which is fixedly and conventionally connected, attached and/or coupled to the vehicle floor pan 44. Specifically, floor side inner member 42 is fixedly coupled to an upwardly extending portion 52 of a floor pan 44 by use of a conventional welding technique or procedure. Vehicle 10 and/or body assembly 11 includes a "floor side outer" member or "rocker panel" 46 which is fixedly coupled to the floor side inner member 42 in manner more fully and completely described below.

The floor side inner member 42 and the floor side outer member 46 are manufactured and/or formed from a relatively rigid and durable material such as steel, iron or aluminum. As best shown in FIG. 2, the floor side inner and outer members 42, 46 are operatively disposed below a door assembly 54 of the vehicle 10. Member 46 operatively abuts and/or engages a conventional seal 53 which is attached to door 54, when door 54 is in a "closed" position. In the preferred embodiment, member 46 also includes a conventional seal 55 which is operatively engaged by door 54, when door 54 is in a "closed" position. Floor side inner member 42 substantially extends the entire length 32 between the front wheel well 22 and the rear wheel well 26. Floor side outer member 46 is substantially and longitudinally coextensive with floor side inner member 42 and has a substantially identical length 32.

Support assembly 14 includes an elongated support tube, rail or member 18, an upper and a lower orthogonally projecting flange or "wing" member or portion 56, 58, a front bracket or plate member 90, and a rear bracket or plate member 100.

Support member 18 is hollow and generally cylindrical in shape, and includes an inner surface 30 and an outer surface 34. In the preferred embodiment of the invention, the support member 18 is manufactured from a relatively rigid and durable material such as a conventional and commercially available metal material (e.g., aluminum, iron and/or steel tubing). Support member 18 extends substantially along the entire length 32 between the front wheel well 22 and the rear wheel well 26 of vehicle 10, and is operatively and supportably disposed within and/or between the floor side inner member 42 and the floor side outer member 46.

Upper flange or wing member 56 is generally "L-shaped" and includes a lower end or portion 60 which is fixedly and conventionally coupled to outer surface 34 of support member 18, and an upper end or portion 62 which extends orthogonally from member 18 and which is disposed between a portion 66 of the floor side inner member 42 and a portion 64 of the floor side outer member 46. In the preferred embodiment, portions 66 and 62, and portions 62 and 64 are each fixedly coupled together by use of a conventional welding technique or procedure (e.g., fusion, wire or spot welding). In this manner portions 62, 64 and 66 are cooperatively and fixedly linked, connected and/or attached. In the preferred embodiment of the invention, upper flange member 56 is manufactured and/or formed from a relatively rigid and durable metal material, and extends substantially along the entire length of member 18. In other non-limiting embodiments, upper flange or member 58 includes two separate flange members which each extends along a separate portion of member 18.

Lower flange or wing member 58 is generally "L-shaped" and includes an upper end or portion 70 which is fixedly and conventionally coupled to outer surface 34 of support member 18, and a lower end or portion 72 which extends orthogonally downward from member 18 and which is disposed between a portion 78 of the floor side inner member 42 and a portion 82 of the floor side outer member 46. In the preferred embodiment, portions 78 and 72, and portions 82 and 72 are each fixedly coupled together by use of a conventional welding technique or procedure (e.g., fusion, wire or spot welding). In this manner portions 72, 78 and 82 are cooperatively and fixedly linked, connected and/or attached. In the preferred embodiment of the invention, lower flange member 58 is manufactured and/or formed from a relatively rigid and durable metal material, and extends substantially along the entire length of member 18.

Figure 4:
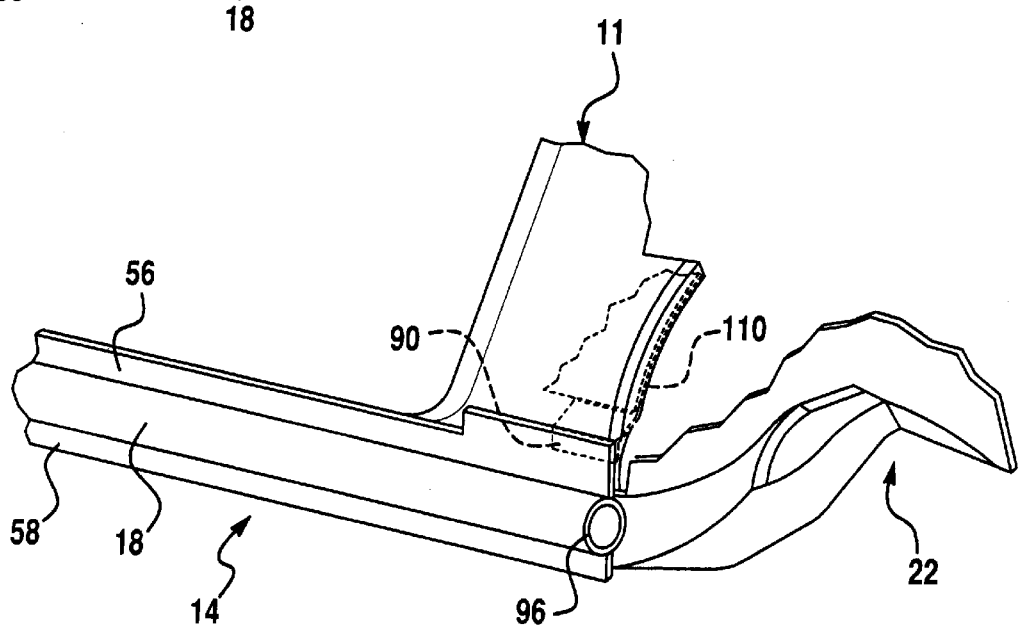
FIG. 4 is a perspective view of the support assembly shown in FIG. 2 with the vehicle rocker panel removed and illustrating a connection to a front portion of the vehicle body.
Figure 7:
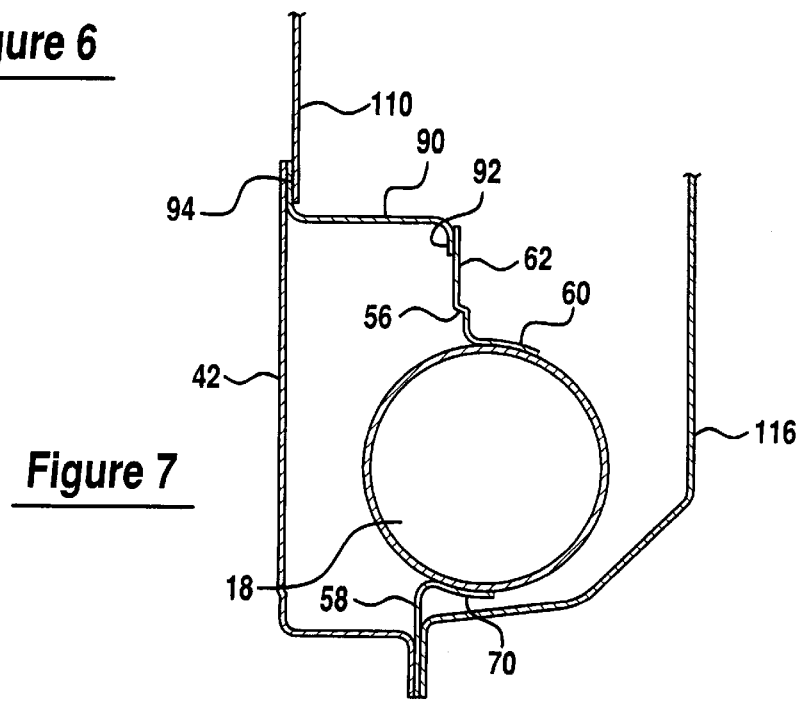
FIG. 7 illustrates a cross-sectional view of a portion of the support assembly taken along line 7—7 of FIG. 1.

As shown best in FIGS. 4 and 7, front bracket or plate member 90 is substantially "Z"-shaped and is operatively disposed in relative close proximity to the front end portion 96 of member 18 which is substantially adjacent to the front wheel well 22. Bracket member 90 includes a lower end 92 which is fixedly and conventionally coupled to portion 62 of flange member 56, and an upper end 94 which is fixedly and conventionally coupled to, and is disposed between, a "cowl side inner" member or portion 110 of body 11 and the floor side inner member 42. In the preferred embodiment of the invention, bracket or plate member 90 is manufactured or formed from a relatively rigid and durable material such as steel, iron or aluminum, and is coupled to portions 110, 42 and 62 by way of conventional welds.

Figure 5:
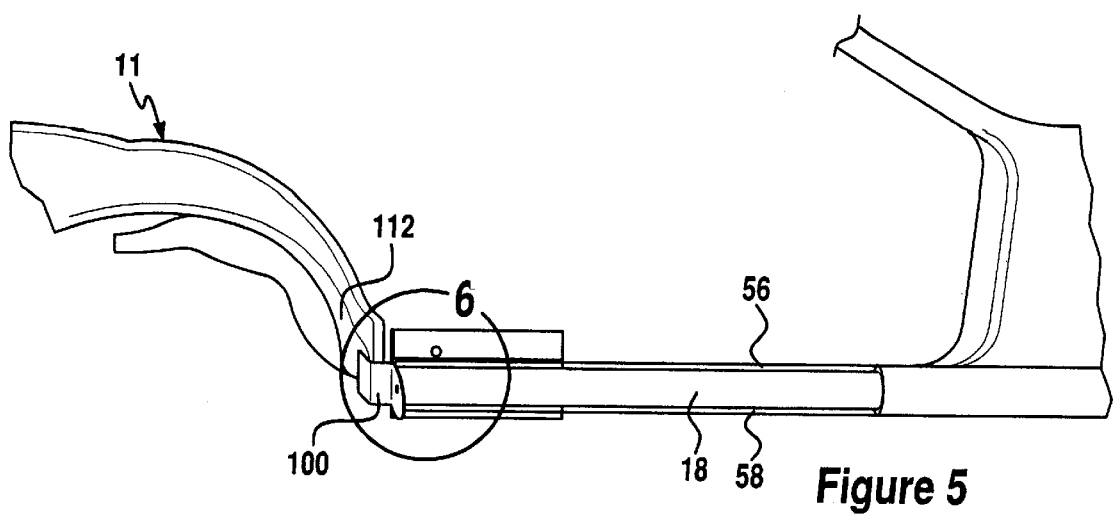
FIG. 5 is a partial perspective view of the support assembly shown in FIG. 2 with a front portion of the vehicle rocker panel removed and illustrating a connection to the rear wheelhouse assembly of the vehicle.
Figure 6:
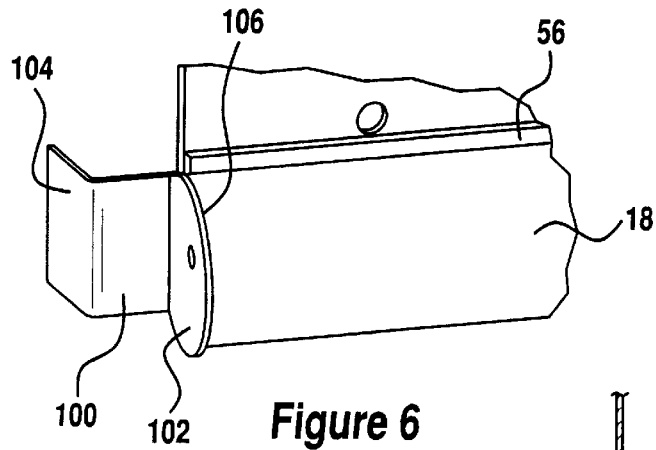
FIG. 6 illustrates an enlarged view of a portion of the support assembly shown in FIG. 5.

As best shown in FIGS. 5 and 6, rear bracket or plate member 100 is substantially "Z"-shaped and includes an end 102 which is fixedly and conventionally coupled the rear end portion 106 of member 18 which is substantially adjacent to the rear wheel well 26, and an end 104 which is fixedly and conventionally coupled to a wheel house assembly or portion 112 of body 11. Portion 112 of body 11 is fixedly attached to and is supported by the underbody 12 of the vehicle 10 in a known and conventional manner. In the preferred embodiment of the invention, bracket or plate member 100 is manufactured or formed from a relatively rigid and durable material such as steel, iron or aluminum, and is connected or attached to member 18 and assembly 112 by way of conventional welds.

Assembly 14 may be installed onto vehicle body 11 and underbody 12 in a relatively quick and simple manner, and offers a significant advantage over prior art support assemblies when both a convertible type vehicle and a sedan type vehicle are manufactured on the same platform or underbody 12. Particularly, a sedan type vehicle may be assembled utilizing all of the components illustrated in FIGS. 1–7 with the exception of the support beam 18, the upper and lower flange or wing members 56, 58, and brackets 90 and 100. During a typical assembly procedure, the rocker panel or floor side outer member 46 is installed onto the underbody 12 once the underbody 12 has been substantially formed and/or constructed. Consequently, no modification in the underbody assembly process is required in order to install assembly 14 on a convertible type vehicle which is manufactured using a sedan type underbody (e.g., underbody 12). Rather, the assembly 14 may be assembled onto the floor side outer member 46 and/or body assembly 11 in a procedure separate from the underbody assembly procedure. Particularly, assembly 14 is installed by respectively attaching or welding brackets 90 and 100 to the cowl side inner member 110 and the wheel house assembly 112, and by respectively welding the upper and lower flanges 56, 58 to the floor side outer member 46. Once flanges 56, 58 have been coupled to the floor side outer member 46, the floor side outer member or rocker panel 46 may be welded to the floor side inner member 42 when the body assembly 11 is connected to the underbody assembly 12. Additionally, other portions of the vehicle body 11 may be attached or connected to the upper and lower flanges 56, 58 for additional support, such as front and rear pillar or panel portions 116, 118. The relatively simple installation procedure provided by assembly 14, allows assembly 14 to be efficiently incorporated into an assembly line or procedure which was originally designed for sedan type vehicles, thereby allowing the same procedure to be used to produce convertible type vehicles with only relatively minor modifications.

In operation, forces and/or loads which are translated to and/or imparted upon the floor pan 44 (e.g., the torsional and bending forces generated when the vehicle is driven) are transferred to support member 18 through flange or wing members 56, 58. Support member 18 assists in absorbing these forces and/or loads, and provides additional rigidity and strength to the center portion of the vehicle.

For example and without limitation, a significant amount of the downward loads and/or forces imparted upon floor pan 44 are translated and/or transferred to the upper and lower flanges 56, 58 by way of the rigid interconnection between flanges 56, 58, floor side inner member 42, and floor pan 44. These loads and/or forces are then translated and/or transferred to the support member 18 by the upper and lower flanges 56, 58. Member 18 "spreads" and/or diffuses forces and loads which are imparted upon the center portion of the vehicle along the entire length 22 of member 18 and floor side inner member 42. Additionally, the attachments provided by brackets 90, 100 allow a portion of these forces to be transferred to and absorbed by the wheel house assembly 112 and the cowl side inner member 110. The wheel house assembly 112 and cowl side inner member 110 further collectively transfer and diffuse these loads and/or forces to other portions of the vehicle body 11 and underbody 12 (e.g., portions which are adjacent to the wheel wells 22 and 26). In this manner, brackets 90, 100 cooperate with support member 18 to transfer torsional loads and/or forces to portions of the vehicle body 11 which are in relative close proximity to the wheel wells 22, 26 and which are best suited to absorb these forces and/or loads, thereby increasing the structural rigidity of the vehicle 10 and improving the overall quality of the vehicle's "ride" and "feel".

It should be understood that this invention is not to be limited to the exact construction or embodiment described above but that various changes may be made without departing from the spirit or scope of the invention.

What is claimed is:

1. A support assembly for use within a vehicle of the type having an underbody and a body assembly which is coupled to said underbody and which includes a front wheel well and a rear wheel well, said support assembly comprising:
    a support member extending substantially between said rear wheel well and said front wheel well;
    an upper flange which projects orthogonally from said support member, which is substantially longitudinally coextensive with said support member, which is fixedly connected to said support member, and which is shaped for selective attachment to said body assembly and to said underbody; and
    a lower flange which projects orthogonally from said support member, which is substantially longitudinally coextensive with said support member, which is fixedly connected to said support member, and which is shaped for selective attachment to said body assembly and to said underbody, said lower flange cooperating with said upper flange to selectively secure said support member to said body assembly and to said underbody, thereby providing support to said body assembly and to said underbody between said front wheel well and said rear wheel well.

2. A support assembly as in claim 1 wherein said support member comprises a generally elongated tube.

3. A support assembly as in claim 1 wherein upper flange and said lower flange are each fixedly connected to a floor side inner portion of said underbody.

4. A support assembly as in claim 1 wherein said vehicle further includes a rear wheelhouse, said support assembly further comprising:
    a generally "Z"-shaped bracket which is fixedly coupled to said rear wheelhouse and to support member.

5. A support assembly as in claim 4 wherein said body assembly includes a cowl side inner member, said support assembly further comprising:
    a second generally "Z"-shaped bracket which is fixedly coupled to said cowl side inner member and to said support member.

6. A support assembly as in claim 1 wherein said underbody includes a floor side inner member, wherein said body assembly includes a floor side outer member, and wherein said support member is operatively disposed between said floor side inner member and said floor side outer member.

7. A support assembly as in claim 6 wherein said upper flange and said lower flange are welded to said floor side inner member.

8. A support assembly as in claim 6 wherein said vehicle further comprises a door assembly and wherein said support member is operatively disposed below said door assembly.

9. A support assembly as in claim 8, wherein said floor side outer member is attached to said floor side inner member after said underbody has been fully assembled.

10. A support assembly as in claim 1 wherein said vehicle is a convertible type vehicle.

11. A support assembly for use in a vehicle having a door, said support assembly comprising:
    a floor side inner member which is disposed below said door;
    a floor side outer member which is disposed below said door;
    a generally cylindrical support member which is longitudinally coextensive with said floor side inner member;
    a first wing member which is attached to said support member, and which is substantially longitudinally coextensive with said support member, and which is fixedly coupled to said floor side inner member and to said floor side outer member; and a second wing member which is attached to said support member, and which is substantially longitudinally coextensive with said support member, and which is fixedly coupled to said floor side inner member and to said floor side outer member, said second wing member cooperating with said first wing member and said support member to provide torsional support to said vehicle.

12. A support assembly as in claim 11 wherein said first wing member and said second wing member are welded to said floor side inner member and to said floor side outer member.

13. A support assembly as in claim 11 wherein said first wing member and said second wing member are each longitudinally coextensive with said support member.

14. A support assembly as in claim 11 wherein said support member includes a front end and a rear end, said support assembly further comprising:
    a first bracket which is fixedly coupled to said front end and to a first portion of said vehicle; and
    a second bracket which is fixedly coupled to said rear end and to a second portion of said vehicle.

15. A support assembly as in claim 11 wherein said vehicle further includes a front wheel well and a rear wheel well, and wherein said support assembly extends substantially between said front wheel well and said rear wheel well.

16. A method for providing additional support to a body of a vehicle, said body including a floor side inner member and a floor side outer member, said method comprising the steps of:
    providing a generally elongated support member, which includes a pair of generally elongated flange portions which longitudinally extend along said support member;
    disposing said generally elongated support member between said floor side inner member and said floor side outer member; and
    fixedly coupling said generally elongated support member to said floor side inner member and said floor side outer member, thereby providing additional support to said body.

17. The method of claim 16 wherein said step of fixedly coupling said support member to said floor side inner member and said floor side outer member includes the steps of:
    fixedly coupling said pair of generally elongated flange portions to said floor side outer member; and
    fixedly coupling said floor side outer member to said floor side inner member.

18. The method of claim 17 wherein said flange portions are welded to said floor side inner member.

19. The method of claim 16 wherein said body includes a front wheel well and a rear wheel well, wherein said support member substantially extends from said front wheel well and said rear wheel well, and wherein said support member is effective to translate torsional forces from a first portion of said body which is disposed between said front and said rear wheel wells to a second portion of said body which is adjacent to said front wheel well and to a third portion of said body which is adjacent to said rear wheel well.

20. The method of claim 16 wherein said body includes a door and wherein said support member is operatively disposed below said door.

* * * * *